United States Patent
Irie et al.

(10) Patent No.: US 9,564,095 B2
(45) Date of Patent: Feb. 7, 2017

(54) LIQUID CRYSTAL DISPLAY DEVICE AND METHOD FOR DRIVING THE LIQUID CRYSTAL DISPLAY DEVICE WHEREBY SHADOWING CAN BE PREVENTED

(71) Applicant: Sakai Display Products Corporation, Sakai-shi, Osaka (JP)

(72) Inventors: Kentaro Irie, Sakai (JP); Masae Kitayama, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 94 days.

(21) Appl. No.: 14/408,231

(22) PCT Filed: Nov. 6, 2013

(86) PCT No.: PCT/JP2013/079957
§ 371 (c)(1),
(2) Date: Dec. 15, 2014

(87) PCT Pub. No.: WO2014/087781
PCT Pub. Date: Jun. 12, 2014

(65) Prior Publication Data
US 2015/0116301 A1    Apr. 30, 2015

(30) Foreign Application Priority Data

Dec. 7, 2012   (JP) .................................. 2012-268263

(51) Int. Cl.
*G09G 3/36*   (2006.01)
*G09G 3/00*   (2006.01)
*G02F 1/1362* (2006.01)

(52) U.S. Cl.
CPC ....... *G09G 3/3659* (2013.01); *G02F 1/136286* (2013.01); *G09G 3/003* (2013.01);
(Continued)

(58) Field of Classification Search
CPC .... G09G 3/003; G09G 3/3614; G09G 3/3677; G09G 3/3659; G09G 3/3611; G09G 3/3648; G09G 3/3666; G09G 3/3688; G09G 2300/0426; G09G 2320/0209; G09G 2370/08; G09G 2320/0214
See application file for complete search history.

(56) References Cited

U.S. PATENT DOCUMENTS 6,489,952 B1 * 12/2002 Tanaka ................. G09G 3/3233
                                                     345/205
2007/0063233 A1 * 3/2007 Joo .................... G02F 1/134336
                                                     257/291
(Continued)

FOREIGN PATENT DOCUMENTS

JP   02-296286    6/1990
JP   2002-072981  3/2002
(Continued)

*Primary Examiner* — Larry Sternbane
(74) *Attorney, Agent, or Firm* — Rudy J. Ng; Bret E. Field; Bozicevic, Field & Francis LLP

(57) ABSTRACT

The present invention relates to a liquid crystal display device that can prevent shadowing, and a method for driving the device. The device comprises a plurality of switching elements. Display pixels connected to the switching elements are connected in a matrix form. Two data signal lines for writing data signals are respectively provided to display pixels in each column.

20 Claims, 9 Drawing Sheets

(52) U.S. Cl.
CPC ......... *G09G 3/3677* (2013.01); *G09G 3/3614* (2013.01); *G09G 2300/0426* (2013.01); *G09G 2320/0209* (2013.01); *G09G 2370/08* (2013.01)

(56) References Cited

U.S. PATENT DOCUMENTS

| | | | | |
|---|---|---|---|---|
| 2007/0085903 | A1* | 4/2007 | Zhang | H04N 13/0434 348/58 |
| 2012/0162170 | A1* | 6/2012 | Ochiai | G11C 19/287 345/208 |
| 2012/0327135 | A1 | 12/2012 | Kitayama et al. | |
| 2013/0063327 | A1 | 3/2013 | Nakahata et al. | |
| 2013/0113778 | A1* | 5/2013 | Yoshimoto | G09G 3/3648 345/212 |

FOREIGN PATENT DOCUMENTS

| | | |
|---|---|---|
| JP | 2002-214645 | 7/2002 |
| JP | 2003-140625 | 5/2003 |
| WO | WO2008053609 A1 | 5/2008 |
| WO | WO2011105514 A1 | 9/2011 |
| WO | WO2012096205 A1 | 7/2012 |
| WO | WO2012127945 A1 | 9/2012 |

\* cited by examiner

LIQUID CRYSTAL DISPLAY DEVICE AND METHOD FOR DRIVING THE LIQUID CRYSTAL DISPLAY DEVICE WHEREBY SHADOWING CAN BE PREVENTED

CROSS-REFERENCE TO RELATED APPLICATIONS

This application is the national phase under 35 U. S. C. §371 of PCT International Application No. PCT/JP2013/079957 which has an International filing date of Nov. 6, 2013 and designated the United States of America.

FIELD

The present invention relates to a liquid crystal display device in which a plurality of switching elements and display pixels connected to the switching elements are connected in a matrix form, and a method for driving the liquid crystal display device.

BACKGROUND

In recent years, for a display part for a device displaying a video and an image, a liquid crystal display panel of an active matrix type using a switching element such as a TFT (thin film transistor) has widely been used. In such a display panel, for example, when performance of displaying moving videos is highly valued, there is a method for driving the device by doubling a frame frequency with a technique which is called as an FRC (Frame Rate Conversion). However, in a case where the frame frequency is doubled without changing the number of lines for one screen, the scanning time for one line is reduced to half. This requires improvement in the charging capacity of a TFT and speed up of a driving circuit for writing data in a display pixel (hereinafter, simply referred to as a pixel).

For example, Japanese Patent Application Laid-Open No. H2-296286 1 describes a substrate for a liquid crystal display in which drain wirings of TFTs (bus line of a data signal) applying a video signal (data signal) to pixel electrodes of pixels in each column are separately arranged for odd-numbered pixels and even-numbered pixels in each column in the vertical direction of a display screen, and a gate wiring of TFTs is arranged commonly for an odd-numbered scanning line and an even-numbered scanning line adjacent to each other in the horizontal direction of the display screen. Compared to a case where an odd-numbered scanning line and an even-numbered scanning line adjacent to each other are separately scanned, the structure allows the doubled scanning time per line and the halved scanning time per line due to the doubled frame frequency to cancel each other out.

In a liquid crystal display device of an active matrix type, a plurality of TFTs are connected to a drain wiring in the vertical direction of a display screen. Generally, only one TFT becomes active at the same time among the TFTs, and the remaining TFTs are inactive. Therefore, a problem may be caused by leakage of a data signal to a pixel electrode from an inactive TFT due to a parasitic capacitance between the drain and the source.

For example, Japanese Patent Application Laid-Open No. 2003-140625 describes a phenomenon as a problem that, when a white or a black box pattern (the circumference of a box region in the middle is a gray back region) is displayed in the middle of a display area, one of the gray back regions in the upper part and the lower part of the screen in the box region is displayed brighter and the other is displayed darker (hereinafter, referred to as shadowing).

To address this problem, according to a liquid crystal display device described in Japanese Patent Application Laid-Open No. 2003-140625, a different drain wiring is provided to TFTs in each column for capacitive coupling, and a compensation signal is supplied to the different drain wiring, thereby solving the problem. It seems that the problem of shadowing may be avoided by applying this technique together with the technique disclosed in Japanese Patent Application Laid-Open No. 112-296286 for displaying a three-dimensional image.

SUMMARY

However, since the different drain wiring in the liquid crystal display device disclosed in Japanese Patent Application Laid-Open No. 2003-140625 is not connected to TFTs directly, the different drain wiring as it is cannot be applied to the drain wiring in the substrate for a liquid crystal display disclosed in Japanese Patent Application Laid-Open No. H2-296286. Even if the different drain wiring is replaced with the drain wiring in the substrate for a liquid crystal display disclosed in Japanese Patent Application Laid-Open No. H2-296286, as long as the adjacent odd-numbered scanning line and even-numbered scanning line are simultaneously scanned using the technique disclosed in Japanese Patent Application Laid-Open No. H2-296286, the above-mentioned compensation signal cannot be separately supplied from the different drain wiring to TFTs adjacent in the vertical direction. Therefore, the problem of shadowing cannot be solved.

The present invention is made in view of the above circumstances. An object of the present invention is to provide a liquid crystal display device that can prevent shadowing and a method for driving the liquid crystal display device, in a case where two data signal lines for writing data signals are respectively provided to the display pixels in each column.

A liquid crystal display device according to the present invention is characterized by comprising a plurality of switching elements arranged in a matrix; a plurality of scanning signal lines for supplying a scanning signal from a scanning signal driving circuit to the respective switching elements in each row; a plurality of data signal lines for supplying a data signal from a data signal driving circuit to the respective switching elements in each column; and a plurality of display pixels respectively connected to the plurality of switching elements, wherein the data signal lines are configured with a first data signal line for supplying the data signal to switching elements in every other row and a second data signal line for supplying the data signal to switching elements in the other rows, and the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line, wherein the scanning signal driving circuit is configured to sequentially supply the scanning signal during a predetermined period through the scanning signal lines included in the first scanning signal line group, and the data signal driving circuit is configured to supply the data signals through the first and second data signal lines during the predetermined period in such a manner that changing directions of voltages of the data signals are opposite to each other.

The liquid crystal display device according to the present invention is characterized in that the scanning signal driving circuit is configured to sequentially supply the scanning signal during a second period that is not overlapped with the predetermined period through the scanning signal lines included in the second scanning signal line group, and a brightness of the display pixel connected to the switching element to which the scanning signal is supplied during the second period is made darker than a brightness of the display pixel connected to the switching element to which the scanning signal is supplied during the predetermined period.

The liquid crystal display device according to the present invention is characterized in that the scanning signal driving circuit is configured to sequentially supply the scanning signal during a second period that is not overlapped with the predetermined period through the scanning signal lines included in the second scanning signal line group, and the data signal driving circuit is configured to supply, during the second period through the second data signal line, a data signal with an effective voltage to be applied to the display pixels being lower than that of an effective voltage for the data signal supplied during the predetermined period.

The liquid crystal display device according to the present invention is characterized in that the scanning signal driving circuit is configured to sequentially supply the scanning signal during a second period that is not overlapped with the predetermined period through the scanning signal lines included in the second scanning signal line group, and the data signal driving circuit is configured to supply, during the second period through the second data signal line, a data signal representing an image darker than an image to be displayed by the data signal supplied during the predetermined period.

The liquid crystal display device according to the present invention is characterized in that a data signal supplied through the first data signal line configures a video frame, and the data signal driving circuit is configured such that, for a data signal supplied through the first data signal line during the predetermined period within one video frame period and for a data signal supplied through the first data signal line during the predetermined period within a video frame following said one video frame period, polarities of voltages of the data signals with respect to a predetermined potential are made opposite to each other.

The liquid crystal display device according to the present invention is characterized in that a data signal supplied through the second data signal line configures a video frame, and the data signal driving circuit is configured such that, for a data signal supplied through the second data signal line during the second period within one video frame period and for a data signal supplied through the second data signal line during the second period within a video frame following said one video frame period, polarities of voltages of the data signals with respect to a predetermined potential are made opposite to each other.

The liquid crystal display device according to the present invention is characterized in that the data signal driving circuit is configured to supply a data signal of a predetermined gradation through the second data signal line during the second period.

The liquid crystal display device according to the present invention is characterized in that the predetermined gradation is a gradation of black.

The liquid crystal display device according to the present invention is characterized by further comprising a polarization filter changing a polarization state of light transmitting through the display pixels connected to the switching elements contained in the every other row to be alternately different states in a row direction.

The liquid crystal display device according to the present invention is characterized in that the polarization filter is configured such that a boundary where a polarization state of light changed by the polarization filter changes and the display pixels connected to the switching elements in the other rows are overlapped in a planer direction of the matrix in which the switching elements are arranged.

The liquid crystal display device according to the present invention is characterized in that the data signal driving circuit is configured to alternately supply data signals respectively representing a left eye image and a right eye image of a three dimensional image through the first data signal line during the predetermined period.

The liquid crystal display device according to the present invention is characterized by further comprising a reception part receiving a predetermined signal, wherein the scanning signal driving circuit is configured to switch between a mode in which, according to the signal received by the reception part, the scanning signal is supplied through the scanning signal line included in the first scanning signal line group during the predetermined period while the scanning signal is supplied through the scanning signal line included in the second scanning signal line group during the second period and a mode in which the scanning signals are supplied through the scanning signal lines respectively included in the first scanning signal line group and the second scanning signal line group during both the predetermined period and the second period.

A method for driving a liquid crystal display device according to the present invention is characterized in that, the device comprising: a plurality of switching elements arranged in a matrix; a plurality of scanning signal lines for supplying a scanning signal from a scanning signal driving circuit to the respective switching elements in each row; a plurality of data signal lines for supplying a data signal from a data signal driving circuit to the respective switching elements in each column; and a plurality of display pixels respectively connected to the plurality of switching elements, wherein the data signal lines are configured with a first data signal line for supplying the data signal to switching elements in every other row and a second data signal line for supplying the data signal to switching elements in the other rows, and the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line, the device being driven by supplying a scanning signal and a data signal from the scanning signal driving circuit and the data signal driving circuit respectively, the method comprising: supplying the scanning signal sequentially during a predetermined period through scanning signal lines included in the first scanning signal line group, and supplying the data signal through the first and second data signal lines during the predetermined period in such a manner that changing directions of voltages of the data signals are opposite to each other.

According to the present invention, while a data signal for one line to be updated for each predetermined time period is written into display pixels in every other row through a first data signal line in each column, data signals each having a voltage changing in a different direction are applied to switching elements in each row through the first and second data signal lines.

Accordingly, when two data signal lines for writing data signals are provided to display pixels in each row, shadowing is prevented as data signals leaking from the first and second data signal lines to the switching elements in the respective rows cancel each other out.

The above and further objects and features will more fully be apparent from the following detailed description with accompanying drawings.

DETAILED DESCRIPTION

Hereinafter, the present invention is described below with reference to the drawings illustrating the embodiments thereof.

Embodiment 1

Figure 1:
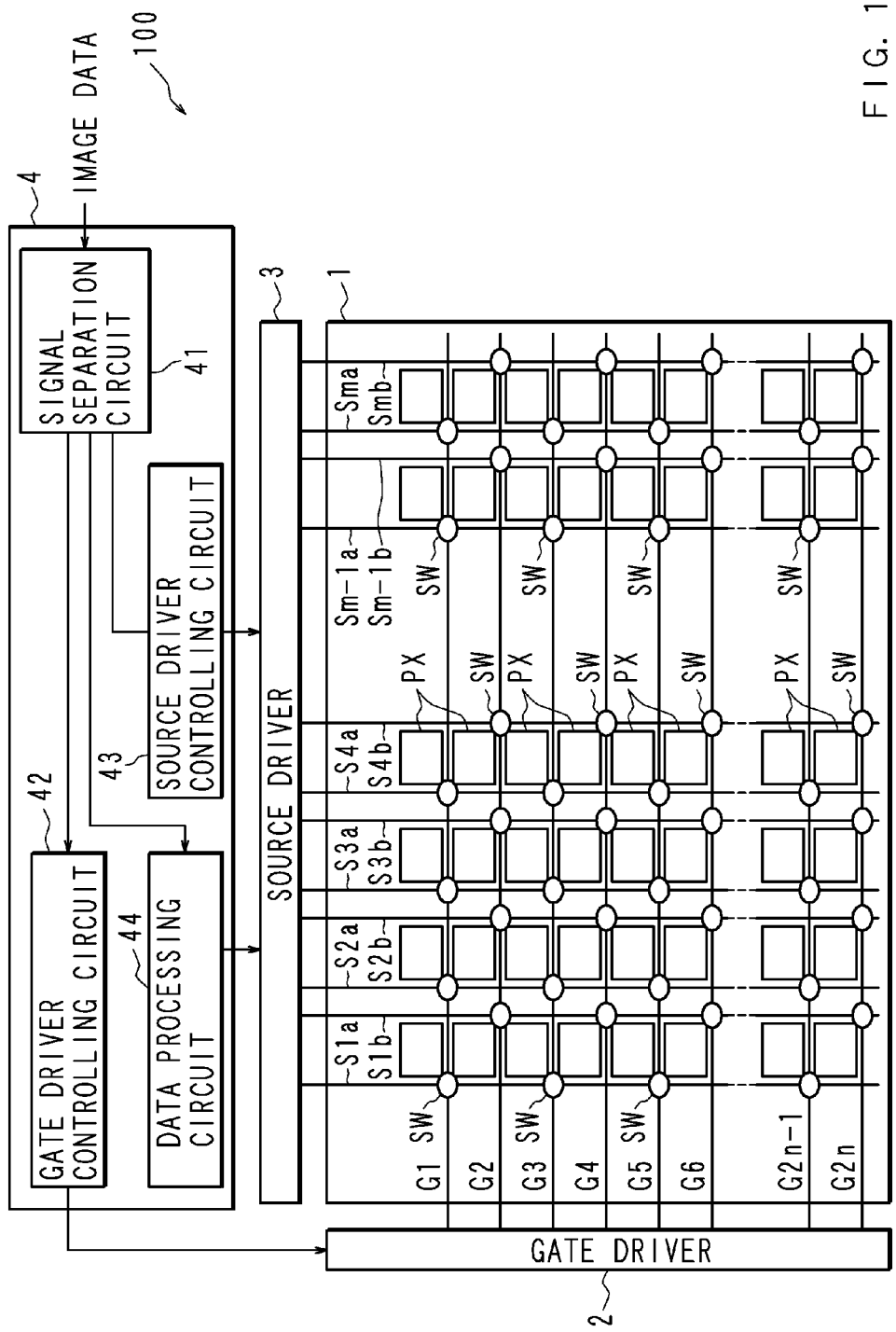
FIG. 1 is a block diagram illustrating a structural example of a liquid crystal display device according to Embodiment 1 of the present invention.

FIG. 1 is a block diagram illustrating a structural example of a liquid crystal display device according to Embodiment 1 of the present invention. In the drawing, the reference number 100 denotes a liquid crystal display device. The liquid crystal display device 100 includes a liquid crystal panel 1 in which display pixels PX changing a polarization direction of light passing through and switching elements SW for writing a data signal in pixel electrodes (not illustrated) of the display pixels PX, are arranged in a matrix form of 2n rows and m columns.

Each of the switching elements SW is configured by a TFT (Thin Film Transistor), and the gates (control terminals) of the switching elements SW contained in each row of the matrix are connected to gate lines (scanning signal lines) G1, G2, . . . G2n, respectively. Among the switching elements SW in each column of the matrix, the sources of the switching elements SW with the gates connected to every other gate lines G1, G3, . . . G2n−1 are connected to source lines (first data signal lines) S1a, S2a, . . . Sma, respectively, and the sources of the switching elements SW with the gates connected to the other gate lines G2, G4, . . . G2n are connected to source lines (second data signal lines) S1b, S2b, . . . Smb, respectively. The drain of each of the switching elements SW is connected to a pixel electrode of a display pixel PX contained in the same row and the same column as each of the switching elements SW.

For convenience, FIG. 1 illustrates that, in the display pixels PX contained in the odd-numbered rows and the display pixels PX contained in the even-numbered rows within the matrix, the relative positions of the respective switching elements SW to the respective display pixels PX are different. It is not limited to the case and is possible to make the relative positions of the switching elements SW to any of the respective display pixels PX constant. In this case, it is preferable that the switching elements SW and the display pixels PX are arranged so that parasitic capacitances generated between the respective drains of switching elements SW in the $x^{th}$ column of the matrix (x is any natural number from 1 to m: the same applies to the following cases) and the respective source lines Sxa and Sxb are equal.

The liquid crystal display device 100 also includes a gate driver 2 that supplies a scanning signal to the gate lines G1, G2, . . . G2n, a source driver 3 that supplies a data signal to the source lines S1a, S1b, S2a, S2b, . . . Sma, Smb, and a timing controller 4 that controls, for example, a timing of a signal supplied from each of the gate driver 2 and the source driver 3.

The timing controller 4 includes a signal separation circuit (reception part) 41 that receives image data representing an image, a gate driver controlling circuit 42 and a source driver controlling circuit 43 that control the gate driver 2 and the source driver 3, respectively, based on a timing signal separated by the signal separation circuit 41, and a data processing circuit 44 that performs processing, for example, inserting black data or the like to the net image data separated by the signal separation circuit 41 and providing the same to the source driver 3.

The gate driver 2 and the gate driver controlling circuit 42 correspond to a scanning signal driving circuit, and the source driver 3 and the source driver controlling circuit 43 correspond to a data signal driving circuit. Also, image data to be received by the signal separation circuit 41 includes control signals other than net image data, such as a horizontal synchronization signal, a vertical synchronization signal, and a display mode switching signal. It is also possible for the signal separation circuit 41 to receive net image data and each of the control signals separately.

The gate driver controlling circuit 42 and the source driver controlling circuit 43 respectively generate control signals, such as a start signal, a clock signal, and an enable signal, which are necessary for periodical operations of the gate driver 2 and the source driver 3.

The gate driver 2 sequentially supplies a scanning signal with a predetermined time difference to each of the gate lines G1, G3, . . . G2n−1 (scanning signal lines included in a first scanning signal line group) within a period (predetermined period) corresponding to a half cycle of a frame frequency of image data, and sequentially supplies a scanning signal with the time difference to each of the gate lines G2, G4, . . . G2n (scanning signal lines included in a second scanning signal line group) within a period (second period) corresponding to the remaining half cycle of the frame frequency.

The source driver 3 accumulates image data (series data) provided from the data processing circuit 44 for a time (one horizontal scanning period) corresponding to the time difference and generates a data signal (parallel data) representing an image for one line. The data signal for one line generated here is updated with the time difference. Then, the data signal for one line as sequentially updated is supplied to the source lines S1a, S2a, . . . Sma in parallel, and at the same time, a data signal with a polarity reversed from that of the data signal for the above-mentioned one line is supplied to the source lines S1b, S2b, . . . Smb in parallel. That is, in Embodiment 1, the source lines Sza and Szb (z is any natural number from 1 to m) are respectively supplied with data signals having polarities different from each other. The data signals supplied to the source lines Sza and Szb are respectively supplied to the switching elements SW contained in the corresponding columns from the source lines Sza and Szb (that is, supplied through the source lines Sza and Szb). The polarities of the data signals herein represent the polarities with respect to the potential (predetermined potential) of a so-called counter electrode facing the pixel electrodes.

As described above, during one horizontal scanning period where a scanning signal is supplied to each of the odd-numbered gate lines G1, G3, . . . G2n−1 (included in the first scanning signal line group), a data signal for one line at the time is written in display pixels PX (in practice, pixel electrodes of the display pixels PX: the same applies to the following description) in the rows containing the switching elements SW with the gates connected to the gate lines G1, G3, . . . G2n−1. Similarly, during one horizontal scanning period where a scanning signal is supplied to each of the even-numbered gate lines G2, G4, . . . G2n (included in the second scanning signal line group), a data signal for one line at the time is written in display pixels PX in the rows containing the switching elements SW with the gates connected to the gate lines G2, G4, . . . G2n. The electric charges by the data signals written in the display pixels PX are maintained until next writing.

Next, an optical structure of the liquid crystal panel 1 is described.

Figure 2:
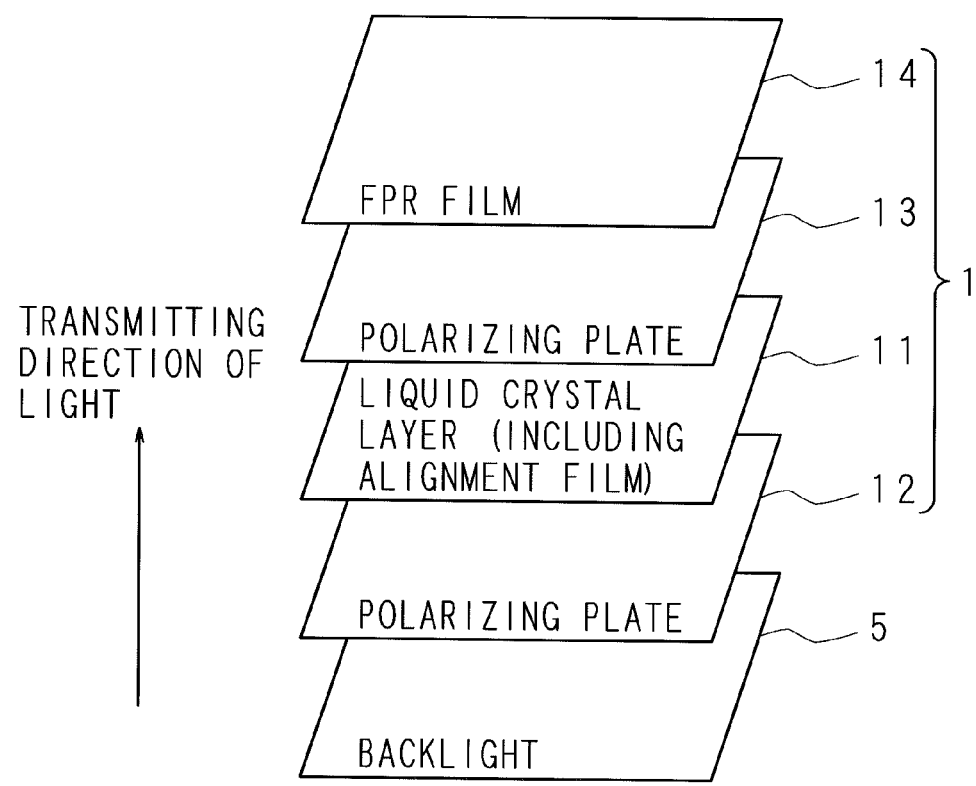
FIG. 2 is an exploded perspective view illustrating a state where optical elements of a liquid crystal panel are separated.

FIG. 2 is an exploded perspective view illustrating a state where optical elements of the liquid crystal panel 1 are separated. The liquid crystal panel 1 includes a liquid crystal layer 11 sandwiched between two light distribution films, polarizing plates 12, 13 respectively disposed on one side and the other side of the liquid crystal layer 11 and allowing linearly polarized light to pass through, the light having angles different from each other by 90 degrees, and a FPR (Film Patterned Retarder) film (polarization filter) 14 in which quarter-wavelength plates are alternately disposed in strip forms for changing the polarization state of light transmitted through the polarizing plate 13 from the other side of the liquid crystal layer 11 to the state of right circular polarization and that of left circular polarization alternately. A backlight 5 is intended for emitting light toward the one side of the liquid crystal panel 1 through the polarizing plate 12.

The drawing does not illustrate an array substrate in which each switching element SW is formed, a transparent electrode in which each pixel electrode is formed, a transparent electrode in which a counter electrode facing each pixel electrode having the liquid crystal layer 11 therebetween, and a color filter disposed between the liquid crystal layer 11 and the polarizing plate 13.

The liquid crystal layer 11 includes the display pixels PX formed in the matrix illustrated in FIG. 1. In a case where a data signal is not applied between a pixel electrode of each display pixel PX and the counter electrode, since the polarization direction of light transmitted through each display pixel PX is not changed, light emitted from the backlight 5 and transmitted through the polarizing plate 12 is absorbed by the polarizing plate 13. To the contrary, in a case where a data signal is applied between a pixel electrode of each display pixel PX and the counter electrode, since the polarization direction of light transmitted through each display pixel PX is changed in accordance with the size of a data signal, the polarization direction of the light emitted from the backlight 5 and transmitted through the polarizing plate 12 is polarized in accordance with the size of the data signal and transmitted through the polarizing plate 13. That is, the luminance of an image displayed by the display pixels PX is changed in accordance with the size of the data signal to be written in the display pixels PX.

With the above described structure, a three-dimensional image is displayed using the display pixels PX arranged in the matrix in Embodiment 1.

Figure 3:
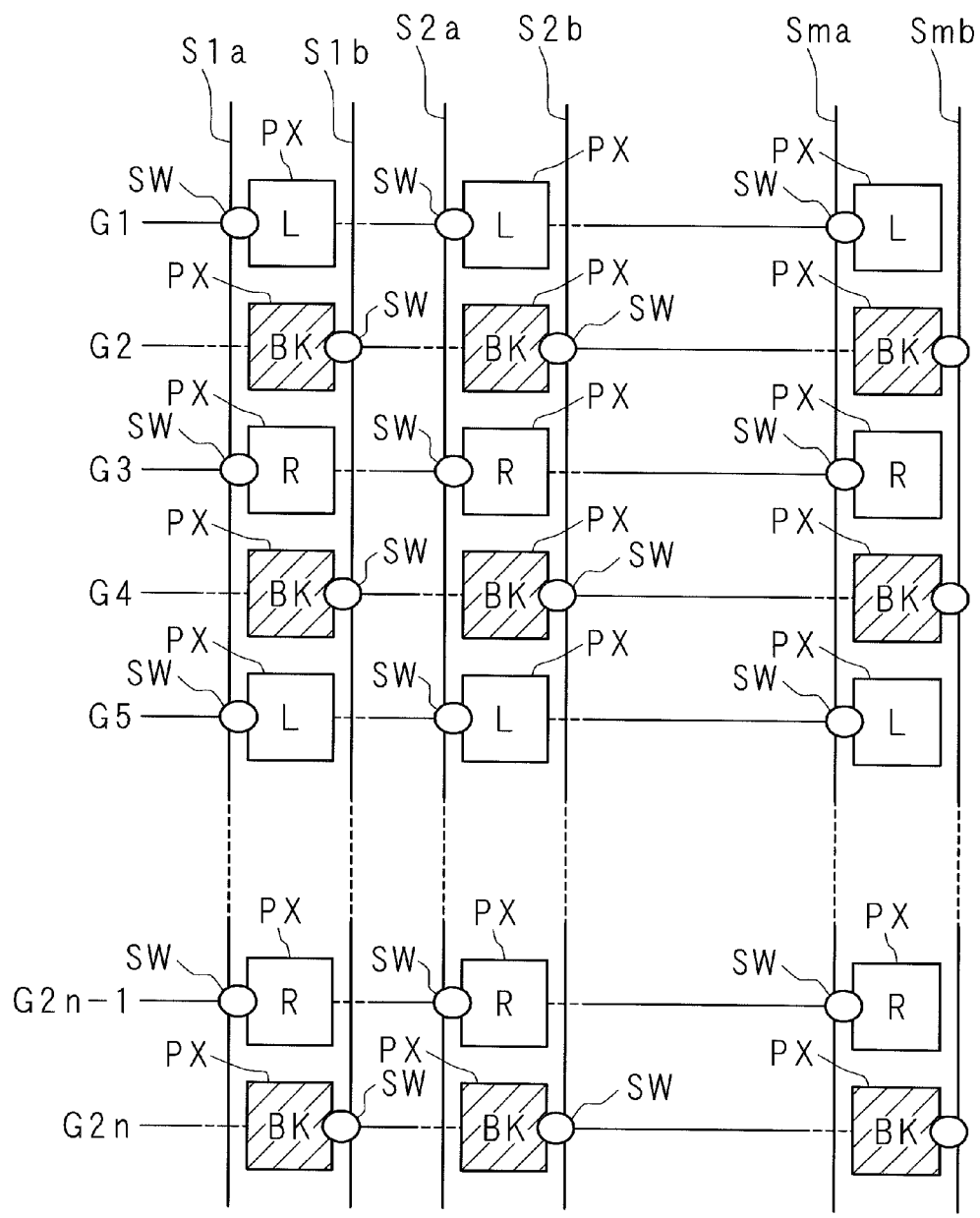
FIG. 3 is an explanatory view illustrating a state where the liquid crystal panel displays a three dimensional image.
Figure 4:
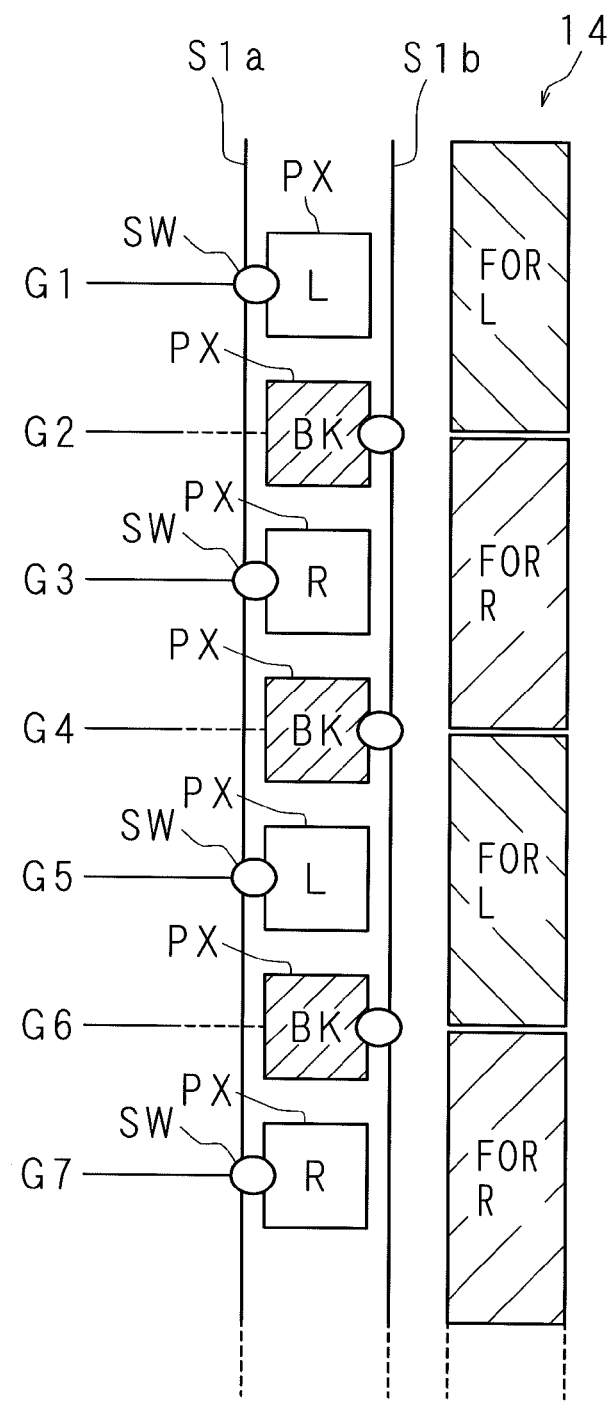
FIG. 4 is an explanatory view illustrating a positional relation among a left eye image, a right eye image and an FPR film.

FIG. 3 is an explanatory view illustrating a state where the liquid crystal panel 1 displays a three dimensional image, and FIG. 4 is an explanatory view illustrating a positional relation among a left eye image, a right eye image and the FPR film 14. In FIGS. 3 and 4, display pixels PX respectively displaying a left eye image and a right eye image are indicated as "L" and "R," and a display pixel PX displaying a black image is indicated as "BK."

As illustrated in FIG. 3, on display pixels PX in the rows containing the switching elements SW with the gates connected to the odd-numbered gate lines G1, G3, . . . G2n−1, a left eye image for one line and a right eye image for one line are alternately displayed. Also, a black image for one line is displayed on display pixels PX in the rows containing the switching elements SW with the gates connected to the even-numbered gate lines G2, G4, . . . G2n. The black image serves as a so-called black matrix.

It may be possible to exchange the order of displaying the left eye image for one line and the right eye image for one line so as to display the image for the right eye image for one line first.

Referring to FIG. 4, with regard to an upper left part of the display screen of the liquid crystal panel 1, the relation between display pixels PX in the liquid crystal layer 11 and the boundary of a region where the state of polarization of light is changed due to the FPR film 14 is illustrated side-by-side. In fact, the liquid crystal layer 11, the polarizing plate 13 and the FPR film 14 are arranged so as to be overlapped in a planer direction in this order (refer to FIG. 2). In the FPR film 14, the regions indicated as "for L" or "for R" represent the regions in which quarter-wavelength plates are arranged for changing, for example, the state of linearly polarized light to the state of left circular polarized light or that of right circular polarized light.

Specifically, in the region indicated as "for L" and the region indicated as "for R," an absorption axis of the quarter-wavelength plate is inclined at 45 degrees in a direction opposite to the polarization direction of light transmitted through the polarizing plate 13. Also, the boundary of the regions indicated as "for L" and "for R" and the display pixel PX indicated as "BK" are overlapped in a planer direction. With this structure, the polarization state of light transmitted through the display pixels PX contained in every other row in the matrix is changed to the left circular polarized state or the right circular polarized state alternately in the row direction.

As described above, it is possible for a viewer to visually recognize a three dimensional image by showing light of each of a left eye image and a right eye image transmitted through the FPR film 14 using predetermined polarizing spectacles. In this case, as the black image displayed by the display pixel PX indicated as "BK" functions as the black matrix, 3D stroke which is generated by a mixture of the right eye image and the left eye image can be prevented.

Figure 5:
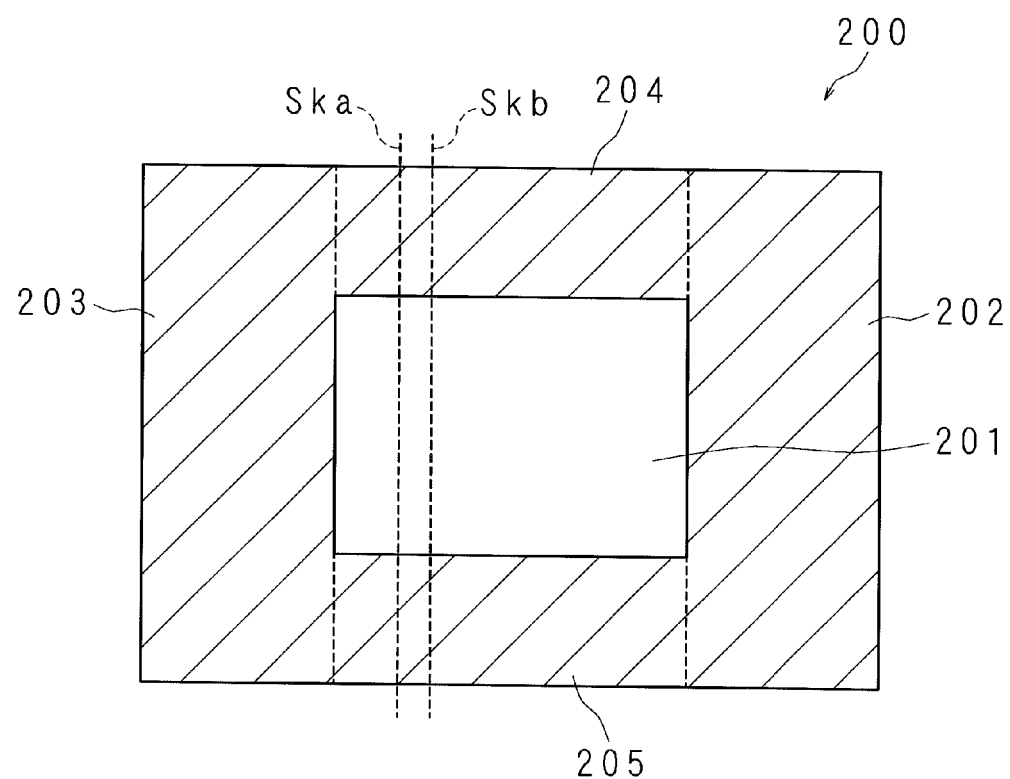
FIG. 5 is an explanatory view illustrating a white box pattern to be displayed on a display screen of the liquid crystal panel.

Next, a case where a box pattern is displayed on the display screen of the liquid crystal panel 1 is described. FIG. 5 is an explanatory view illustrating a white box pattern 200 to be displayed on the display screen of the liquid crystal panel 1. Such a box pattern 200 is displayed as a left eye image and a right eye image as illustrated in FIG. 3. In FIG. 5, a white rectangular region 201 is displayed in the middle portion of the display screen, gray side regions 202, 203 are respectively displayed at the right side and the left side of the rectangular region 201 when seen from a viewer, and a gray upper region 204 and a gray lower region 205 are respectively displayed at the upper part and the lower part of the rectangular region 201. Those gray regions have the same luminance.

When the white box pattern 200 as illustrated in FIG. 5 is displayed on the display screen of the liquid crystal panel 1, the voltage of a data signal supplied from a source line Ska (k is any natural number not exceeding m) to display pixels PX contained in every other row within the side regions 202, 203 and continued in a vertical direction for displaying a left eye image and a right eye image is a constant voltage that corresponds to the luminance of gray. On the other hand, the voltage of a data signal supplied from the source line Ska to the display pixels PX contained in every other row and continued in a vertical direction through the upper region 204, the rectangular region 201 and the lower region 205, for displaying a left eye image and a right eye image, is sequentially changed with time so as to correspond to gray, white, and gray within a period during which a data signal representing the box pattern 200 is supplied. The source line Skb is used for supplying a data signal for causing display pixels PX in the other rows (every other row) to display a black image. Hereinafter, the following description will be made on the assumption that the source lines Ska, Skb are present in a position almost overlapped in a planer direction with the position indicated by the vertical broken lines in FIG. 5.

According to the liquid crystal display device 100 of the present invention, when a left eye image, a black image and a right eye image as illustrated in FIG. 3 are displayed, it is possible to write a data signal for one line of each of the left eye image and the black image (or a data signal for one line of each of the right eye image and the black image) in display pixels PX contained in two successive rows in the matrix at the same time. Although such a writing is not performed in Embodiment 1, the above-mentioned case of writing in two lines at the same time is described for comparison.

Figure 6A:
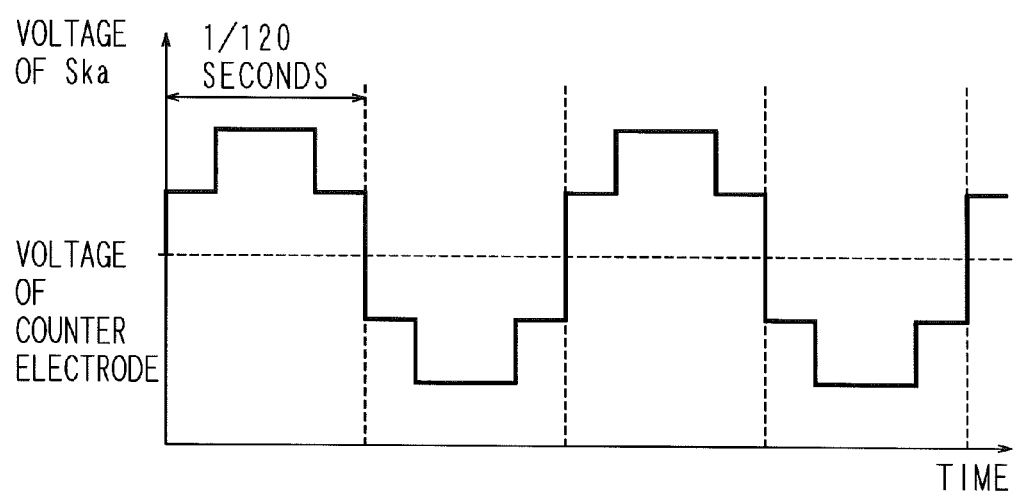
FIG. 6A is a timing chart illustrating the voltage of a source line to which a data signal representing a box pattern is supplied.
Figure 6B:
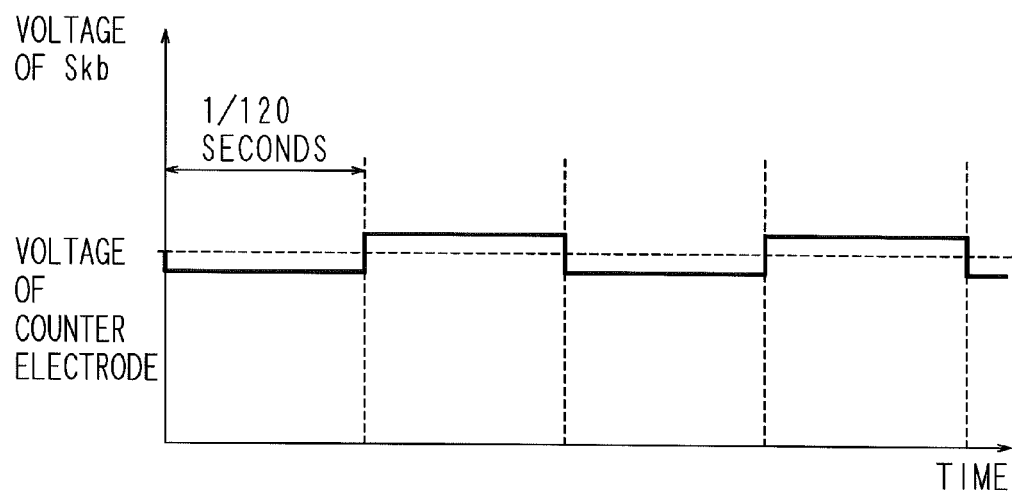
FIG. 6B is a timing chart illustrating the voltage of a source line to which a data signal representing a black image is supplied.

FIG. 6A is a timing chart illustrating the voltage of the source line Ska to which a data signal representing the box pattern 200 is supplied, and FIG. 6B is a timing chart illustrating the voltage of the source line Skb to which a data signal representing a black image is supplied.

In each of FIGS. 6A and 6B, the same time axis is presented as a horizontal axis while a vertical axis represents the voltage of each of the source line Ska and the source line Skb. Each of the periods divided with broken lines in the horizontal axis corresponds to $1/120$ seconds. The voltage of each of the source lines Ska, Skb is changed in cycles of $1/60$ seconds (twice the $1/120$ seconds). Between the period of $1/120$ seconds representing the first half of each cycle (predetermined period) and the period of $1/120$ seconds representing the latter half of each cycle (second period), the polarities of the voltages of the source lines Ska, Skb with respect to the voltage of the counter electrode are reversed. This is for AC-driving the liquid crystal layer 11. The reason why the voltage of the source line Ska changes upwardly in a protruded shape or downwardly in a protruded shape as illustrated in FIG. 6A is that the voltage of the data signal supplied from the source line Ska sequentially changes with time to a voltage corresponding to gray, white and gray within the period corresponding to one cycle of a frame frequency, as described above.

In a case where such a data signal is supplied from the source line Ska to every other display pixels PX continued in a vertical direction along the source line Ska, a so-called shadowing is generated, whereby gray in the upper region 204 becomes brighter, and gray in the lower region 205 becomes darker in FIG. 5. This is caused because the amount of change in the voltage of the source line Ska leaks to the pixel electrodes of the every other display pixels PX within the upper region 204 and the lower region 205 at the time of starting the writing of a data signal representing a white image from the source line Ska to every other display pixels PX within the white rectangular region 201 and the time of completing the writing. (The crosstalk is described in detail in Japanese Patent Application Laid-Open No. 112-296286.)

Therefore, in Embodiment 1, without performing the above described simultaneous writing in two lines, a data signal to be written in the display pixels PX is supplied from one of the source lines Ska, Skb, and a signal for compensating a leakage by the data signal is supplied from the other one of the source lines Ska, Skb.

Figure 7A:
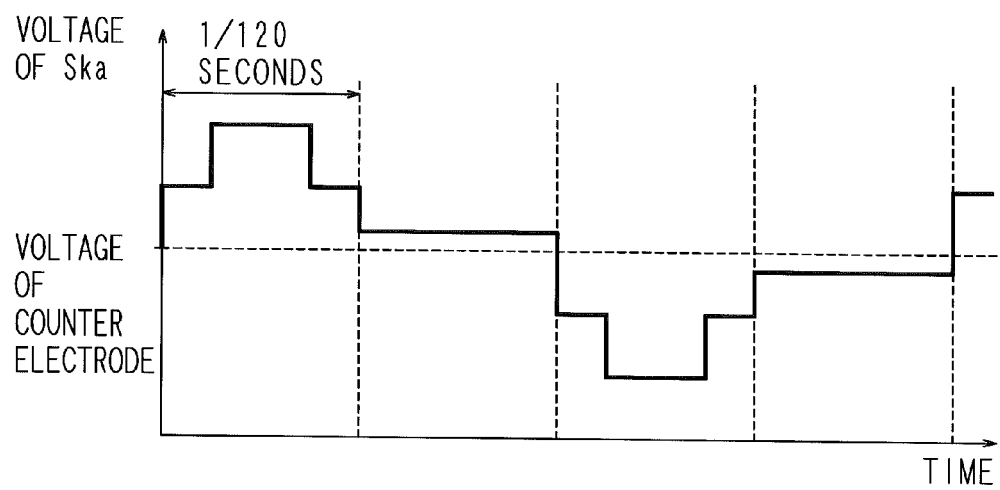
FIG. 7A is a timing chart illustrating the voltage of a source line to which a data signal representing a box pattern and a compensation signal of a black image are supplied.
Figure 7B:
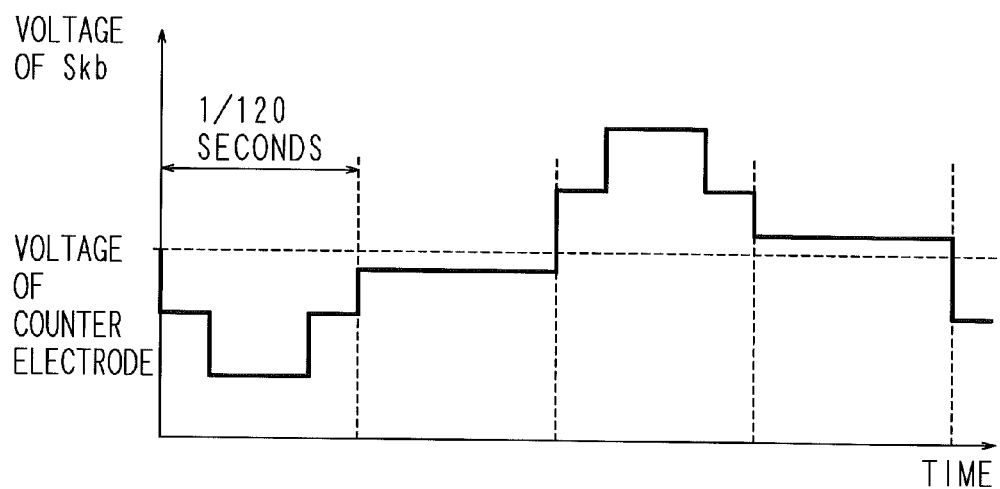
FIG. 7B is a timing chart illustrating the voltage of a source line to which a data signal representing a black image and a compensation signal of a box pattern are supplied.

FIG. 7A is a timing chart illustrating the voltage of the source line Ska to which a data signal representing the box pattern 200 and a compensation signal of a black image are supplied, and FIG. 7B is a timing chart illustrating the voltage of the source line Skb to which a data signal representing a black image and a compensation signal of the box pattern 200 are supplied.

In each of FIGS. 7A and 7B, the same time axis is presented as a horizontal axis, and a vertical axis represents the voltage of each of the source line Ska and the source line Skb. Each of the periods divided with broken lines in the horizontal axis corresponds to $1/120$ seconds. The voltage of each of the source lines Ska, Skb is changed in cycles of $1/30$ seconds (four times the $1/120$ seconds). Between the period of $1/60$ seconds representing the first half of each cycle (twice the $1/120$ seconds) and the period of $1/60$ seconds representing the latter half of each cycle, the polarities of the voltages of the source lines Ska, Skb with respect to the voltage of the counter electrode are reversed.

Firstly, during the first period of $1/120$ seconds illustrated in FIG. 7A, a data signal representing the box pattern 200 is supplied from the source line Ska to every other display pixels PX continued in a vertical direction along the source line Ska. During this period, a compensation signal of the box pattern 200 illustrated in FIG. 7B is supplied from the source line Skb as a reversed signal of the data signal supplied from the source line Ska. The compensation signal is not written in the every other display pixels PX directly, but acts to cancel crosstalk due to a rise and a fall in the voltage of the source line Ska.

The compensation signal supplied from the source line Skb does not necessarily need to have an opposite polarity with respect to a data signal representing the box pattern 200 supplied from the source line Ska as long as the compensation signal has a fall and a rise corresponding to a rise and a fall in the data signal supplied from the source line Ska. Also, the degrees of a fall and a rise in the compensation signal supplied from the source line Skb do not need to be the same as the degrees of a rise and a fall in the data signal supplied from the source line Ska. They can be adjusted by a pixel electrode of each display pixel PX in accordance with the size of crosstalk received from each of the source lines Ska, Skb.

Next, during the second period of 1/120 seconds illustrated in FIG. 7B, a data signal representing a black image is supplied from the source line Skb to the other (every other) display pixels PX continued in a vertical direction along the source line Skb. During this period, a black compensation signal illustrated in FIG. 7A is supplied from the source line Ska as a signal with a polarity opposite to that of the data signal supplied from the source line Skb. The compensation signal is not written in the other (every other) display pixels PX directly, but acts to cancel crosstalk due to the voltage of the source line Skb. Since the data signal representing the black image supplied from the source line Skb has a constant voltage, the black compensation signal is not necessarily supplied from the source line Ska during the second period of 1/120 seconds.

The data signal supplied from the source line Skb does not necessarily need to be a data signal representing a black image, but it can be a data signal having an effective voltage applied between the pixel electrode of the display pixel PX and the counter electrode, which is lower when compared to a data signal representing an image supplied from the source line Ska. For example, the data signal can be a data signal representing gray of a predetermined gradation. It is also possible to make, for example, an image displayed based on the data signal supplied from the source line Skb darker than an image displayed based on the data signal supplied from the source line Ska.

Next, the above-described operation for writing a data signal in each display pixel PX is described in view of a relation with time. In the case where the signal separation circuit 41 receives a display mode switching signal (predetermined signal) contained in image data (or where receiving a display mode switching signal apart from image data), the liquid crystal display device 100 according to Embodiment 1 is switched to a display mode as descried below when it is instructed to display a three dimensional image by the received display mode switching signal.

Figure 8:
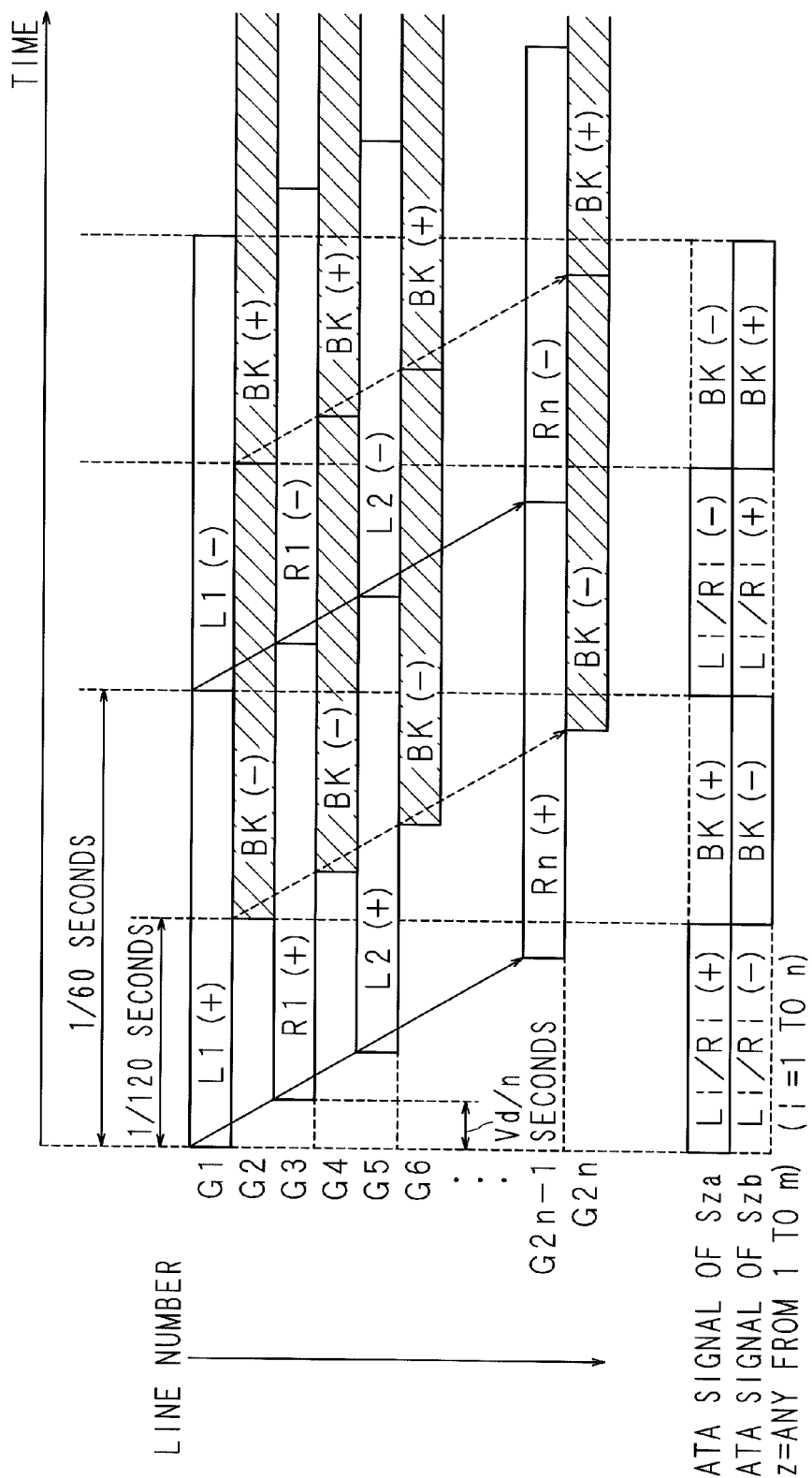
FIG. 8 is a timing chart illustrating a time-series variation of a data signal and a scanning signal in the liquid crystal display device according to Embodiment 1 of the present invention.

FIG. 8 is a timing chart illustrating a time-series variation of a data signal and a scanning signal in the liquid crystal display device 100 according to Embodiment 1 of the present invention. In FIG. 8, the horizontal axis represents time, and the downward direction with respect to the drawing shows an increasing order of the numbers of lines in which a data signal is written in display pixels PX in accordance with a scanning signal from each of the gate lines G1, G2, ... G2n. In the horizontal axis, each of the periods divided with broken lines corresponds to 1/120 seconds, and one cycle (video frame period) of a frame frequency corresponds to 1/60 seconds. Also, in FIG. 8, contents of a data signal supplied from each of the source lines Sza, Szb (z is any natural number from 1 to m: the same applies to the following cases) are illustrated in association with time. Among them, the data signal surrounded by solid lines is the data signal to be actually written in display pixels PX, and the data signal partially surrounded by broken lines is a compensation signal.

From the odd-numbered gate lines G1, G3, ... G2n−1 (included in the first scanning signal line group), a scanning signal is sequentially supplied for every Vd/n seconds (Vd=Vdisp [effective display period]) during the period of 1/120 seconds representing the first half of each frame. Also, from the even-numbered gate lines G2, G4 ... G2n (included in the second scanning signal line group), a scanning signal is sequentially supplied for every Vd/n seconds during the period of 1/120 seconds representing the latter half of each frame.

On the other hand, from a plurality of source lines Sza (namely, S1a, S2a, ... Sma), a data signal (L1 (+)) representing an image at the first line of a left eye image is supplied during the first period of Vd/n seconds within the period of 1/120 seconds representing the first half of the first frame, and a data signal (R1 (+)) representing an image at the first line of a right eye image is supplied during the second period of Vd/n seconds. Also, from a plurality of source lines Szb (namely, S1b, S2b, ... Smb), a data signal (L1 (−)) representing an image at the first line of a left eye image is supplied during the first period of Vd/n seconds within the period of 1/120 seconds representing the first half of the first frame, and a data signal (R1 (−)) representing an image at the first line of a right eye image is supplied during the second period of Vd/n seconds. Herein, the data signal with (−) has the polarity opposite to that of the data signal with (+), which serves as a compensation signal for the data signal with (+).

In this manner, from the plurality of source lines Sza, a data signal (Li (+)) representing an image at the $i^{th}$ line of the left eye image is supplied during the $2i-1^{th}$ period of Vd/n seconds (i is any natural number from 1 to n: the same applies to the following cases) within the period of 1/120 seconds representing the first half of the first frame is supplied, and a data signal (Ri (+)) representing an image at the $i^{th}$ line of the right eye image is supplied during the $2i^{th}$ period of Vd/n seconds. Moreover, from the plurality of source lines Szb, a data signal (Li (−)) representing an image at the $i^{th}$ line of the left eye image is supplied as a compensation signal during the $2i-1^{th}$ period of Vd/n seconds within the period of 1/120 seconds representing the first half of the first frame, and a data signal (Ri (−)) representing an image at the $i^{th}$ line of the right eye image is supplied as a compensation signal during the $2i^{th}$ period of Vd/n seconds.

Next, from the plurality of source lines Szb, a data signal (BK (−)) representing a black image is supplied for the period of 1/120 seconds representing the latter half of the first frame. Also, from the plurality of source lines Sza, a data signal (BK (+)) representing a black image is supplied as a compensation signal for the period of 1/120 seconds representing the latter half of the first frame.

The polarities of the data signals are reversed between the period of 1/60 seconds within the first frame (one video frame period) and the period of 1/60 seconds within the second frame (the video frame period following the above-mentioned one video frame period), as described by referring to FIGS. 7A and 7B.

The polarity of a data signal representing a black image is not limited to the above described polarity, but can be the opposite polarity. In such a case, from the plurality of source lines Szb, a data signal (BK (+)) representing a black image is supplied for the period of 1/120 seconds representing the latter half of the first frame, and a data signal (BK (−)) representing a black image is supplied from the plurality of source lines Sza as a compensation signal. Within the following period of 1/120 seconds representing the latter half of the second frame, a data signal (BK (−)) representing a black image is supplied from the plurality of source lines Szb, and a data signal (BK (+)) representing a black image is supplied from the plurality of source lines Sza as a compensation signal.

As described above, according to Embodiment 1, display pixels PX and switching elements SW connected to the display pixels PX are arranged in the matrix with 2n rows and m columns. A data signal line for supplying a data signal to the respective switching elements SW in each column is separated into the source lines (first data signal lines) S1a, S2a, . . . Sma and the source lines (second data signal lines) S1b, S2b, . . . Smb so as to supply different data signals to the switching elements SW in every other row and to the switching elements SW in the other rows, respectively. Among the scanning signal lines for supplying a scanning signal to the switching elements SW in each row, the gate lines G1, G3, . . . G2n−1 for supplying scanning signals to the switching elements SW to which data signals are supplied from the source lines S1a, S2a, . . . Sma are grouped in the first scanning line group, and the gate lines G2, G4, . . . G2n for supplying scanning signals to the switching elements SW to which data signals are supplied from the source lines S1b, S2b, . . . Smb are grouped in the second scanning line group. The scanning signal driving circuit (gate driver 2 and gate driver controlling circuit 42) sequentially supplies a scanning signal to the gate lines G1, G3, . . . G2n−1 included in the first scanning signal line group for every Vd/n seconds within the period of 1/120 seconds representing the first half of the period of 1/60 seconds corresponding to one cycle of the frame frequency. The data signal driving circuit (source driver 3 and source driver controlling circuit 43) supplies a data signal through the first data signal line Sza (z is any natural number from 1 to m) of each column during the period of 1/120 seconds representing the first half while, through the second data signal line Szb in each column, supplying a data signal with a voltage changing in an opposite direction when compared to the above-mentioned data signal.

With this structure, a data signal for one line updated for each predetermined time period is written in the display pixels PX in every other row through the first data signal line in each column while data signals with voltages changing in different directions are applied to the first and second data signal lines.

Accordingly, in a case where two data signal lines for writing data signals are provided to the display pixels PX in each row, data signals leaking from the first and second data signal lines to the respective switching elements SW in each row cancel each other out, thereby preventing shadowing.

Further, the scanning signal driving circuit sequentially supplies a scanning signal for every Vd/n seconds (Vd=Vdisp) within the period of 1/120 seconds representing the latter half following the period of 1/120 seconds representing the first half through the gate lines G2, G4, . . . G2n included in the second scanning signal line group. Then, the brightness of the display pixels PX connected to the switching elements SW in the even-numbered rows to which a scanning signal is supplied during the period of 1/120 seconds representing the latter half is made darker than the brightness of the display pixels connected to the switching elements SW in the odd-numbered rows to which a scanning signal is supplied during the period of 1/120 representing the first half.

Thus, in a case where a backlight is prepared, it is possible to cause the display pixels PX contained in the rows between every other row to display an image darker than an image displayed by the display pixels PX contained in the every other row.

Also, while the scanning signal driving circuit sequentially supplies a scanning signal for every Vd/n seconds within the period of 1/120 seconds representing the latter half following the first period of 1/120 seconds representing the first half through the gate lines G2, G4, . . . G2n included in the second scanning signal line group, the data signal driving circuit supplies, from the second data signal line Szb in each column during the period of 1/120 seconds representing the latter half, a data signal with an effective voltage applied to the display pixels PX which is lower than that of the data signal supplied from the first data signal line Sza in each column during the period of 1/120 seconds representing the first half.

Accordingly, it is possible to write a data signal representing an image darker than an image to be displayed by the display pixels PX contained in every other row in the display pixels PX contained in the rows between the every other row.

Moreover, while the scanning signal driving circuit sequentially supplies a scanning signal for every Vd/n seconds within the period of 1/120 seconds representing the latter half following the period 1/120 seconds representing the first half through the gate lines G2, G4, . . . G2n contained in the second scanning signal line group, the data signal driving circuit supplies from the second data signal line Szb in each column during the period of 1/120 seconds representing the latter half, a data signal representing an image darker than an image to be displayed by the data signal supplied during the period of 1/120 seconds representing the first half.

Accordingly, it is possible to write, in the display pixels PX contained in the rows between every other row, a data signal representing an image darker than an image to be displayed by the display pixels PX contained in the every other row.

Furthermore, for a data signal supplied from the source lines S1a, S2a, . . . Sma during the period of 1/120 seconds representing the first half of the first frame and a data signal supplied from the source lines S1a, S2a, . . . Sma during the period of 1/120 seconds representing the first half of the second frame, the data signal driving circuit makes the polarities of the voltages of the data signals with respect to the potential of the counter electrode different from each other.

Thus, the polarities of voltages applied to the liquid crystal are not biased and image burning can be prevented, thereby improving the reliability.

Moreover, for a data signal supplied from the source lines S1b, S2b, . . . Smb during the period of 1/120 seconds representing the latter half of the first frame and a data signal supplied from the source lines S1b, S2b, . . . Smb during the period of 1/120 seconds representing the latter half of the second frame, the data signal driving circuit makes the polarities of the voltages of the data signals with respect to the potential of the counter electrode different from each other.

Thus, the polarities of voltages applied to the liquid crystal are not biased and image burning can be prevented, thereby improving the reliability.

Furthermore, the data signal driving circuit supplies a data signal of a predetermined gradation from the source lines S1b, S2b, . . . Smb during the period of 1/120 seconds representing the latter half.

Accordingly, it is possible to easily generate a data signal representing an image darker than an image to be displayed by the display pixels PX contained in every other row as a data signal with a constant gradation.

Moreover, the data signal of the predetermined gradation supplied from the source lines S1b, S2b . . . Smb during the period of 1/120 seconds representing the latter half is made as a data signal of black gradation.

Accordingly, it is possible to write in the display pixels PX contained in the rows between every other row a data signal representing the darkest image with respect to the luminance of the image to be displayed by the display pixels PX contained in the every other row.

Furthermore, the polarization state of light transmitted through the display pixels PX connected to the switching elements SW in the every other row are changed by the FPR film 14 so as to be alternately different in the row direction.

Accordingly, in a case where a backlight is prepared and alternately different images are displayed by the display pixels PX contained in every other row line by line, it is possible to make the polarization states of light from the images alternately displayed different from each other.

Moreover, the boundary of the region where the polarization state of light is changed due to the FPR film 14 and the display pixels PX connected to the switching elements SW in the rows between the every other row are overlapped in a planer direction of the matrix where the switching elements SW are arranged.

Thus, in a case where a backlight is prepared and alternately different images are displayed by the display pixels PX contained in every other row line by line, and an image darker than the different image is displayed by the display pixels PX contained in the rows between the every other row, it is possible to prevent 3D crosstalk from the alternately displayed images.

Moreover, the data signal driving circuit alternately supplies data signals respectively representing a left eye image and a right eye image of a three dimensional image through the source lines S1a, S2a . . . Sma during the period of 1/120 seconds representing the first half.

Thus, it is possible to alternately write the data signals respectively representing the left eye image and the right eye image in the display pixels PX contained in the every other row. Also, when causing the display pixels PX contained in the every other row to display the left eye image and the right eye image alternately line by line with a backlight, it is possible to make the polarization states of light from the left eye image and the right eye image different from each other through the polarization filter.

Embodiment 2

While Embodiment 1 is the embodiment where a data signal representing an image at the $i^{th}$ line (i is any natural number from 1 to n) of each of a left eye image and a right eye image of a three dimensional image is alternately and successively written in display pixels PX contained in the every other row of the matrix, Embodiment 2 is the embodiment where a data signal representing an image of two successive lines among data signals representing a two dimensional image is sequentially written in display pixels PX contained in two successive rows of a matrix. In a case where a signal separation circuit 41 receives a display mode switching signal (predetermined signal) contained in image data (or when receiving a display mode switching signal apart from image data), a liquid crystal display device 100 according to Embodiment 2 is switched to a display mode as descried below when it is instructed to display a two dimensional image by the received display mode switching signal.

Figure 9:
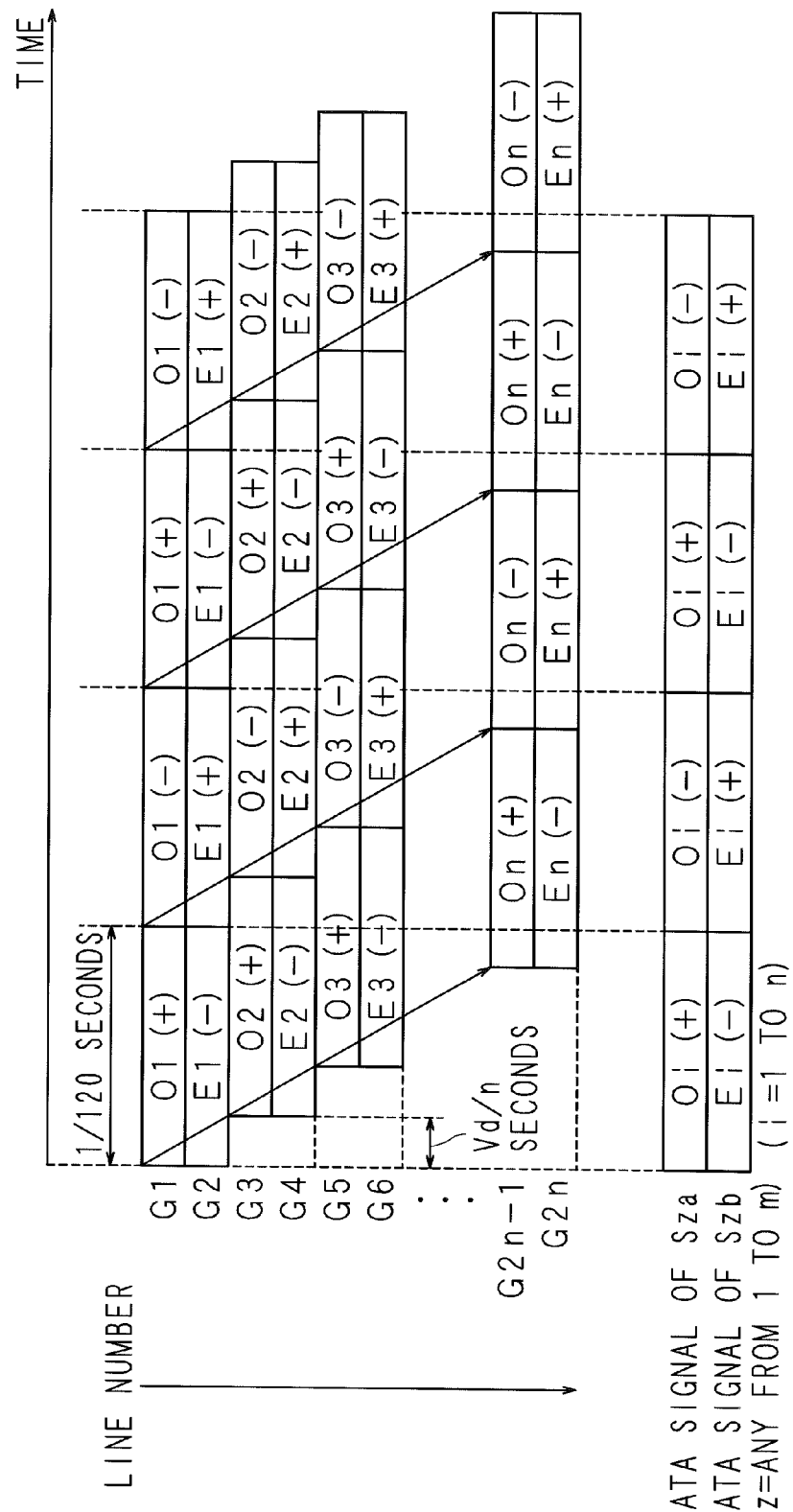
FIG. 9 is a timing chart illustrating a time-series variation of a data signal and a scanning signal in a liquid crystal display device according to Embodiment 2 of the present invention.

FIG. 9 is a timing chart illustrating a time-series variation of a data signal and a scanning signal in the liquid crystal display device 100 according to Embodiment 2 of the present invention. In FIG. 9, the horizontal axis represents time, and the downward direction with respect to the drawing shows an increasing order of the numbers of lines in which a data signal is written in display pixels PX in accordance with a scanning signal from each of the gate lines G1, G2, . . . G2n. In the horizontal axis, each of the periods divided with broken lines corresponds to 1/120 seconds, and one cycle of a frame frequency corresponds to 1/60 seconds. Also, in FIG. 9, contents of a data signal supplied from each of the source lines Sza, Szb (z is any natural number from 1 to m: the same applies to the following cases) are illustrated in association with time.

From the adjacent odd-numbered gate lines and even-numbered gate lines G1, G2, G3, G4, . . . and G2n−1, G2n, a scanning signal is sequentially supplied for every Vd/n seconds during the period of 1/120 seconds in each frame. In other words, a scanning signal is supplied to the successive two gate lines G2i−1, G2i (i is a natural number from 1 to n) among 2n lines of the gate lines G1, G2, G3, G4 . . . G2n−1, G2n (included in the first and second scanning signal line groups) at the same timing.

On the other hand, from a plurality of source lines Sza (namely, S1a, S2a, . . . Sma), a data signal (O1 (+)) representing an image for the first line of the odd-numbered lines is supplied during the first period of Vd/n seconds within the period of 1/120 seconds of the first frame, and a data signal (E1 (−)) representing an image for the first line of the even-numbered lines is supplied during the second period of Vd/n seconds. Also, from a plurality of source lines Szb (namely, S1b, S2b, . . . Smb), a data signal (O2 (+)) representing an image for the second line of the odd-numbered lines is supplied during the first period of Vd/n seconds within the period of 1/120 seconds of the first frame, and a data signal (E2 (−)) representing an image for the second line of the even-numbered lines is supplied during the second period of Vd/n seconds. Herein, the data signal with (−) has the polarity opposite to that of the data signal with (+). Accordingly, the data signal written in the display pixels PX has reversed polarity for each line.

The polarity of data signal is reversed between the period of 1/120 seconds of the first frame and the period of 1/120 seconds of the second frame. Thereafter, the polarity of the data signal in the third frame is the same as the first frame, and that of the fourth frame is the same as the second frame.

Same reference numerals are assigned to the portions which are similar to those in Embodiment 1, and no detailed description thereof is provided.

As described above, according to Embodiment 2, when instructed by the mode switching signal received by the signal separation circuit 41 to display a two dimensional image, the scanning signal driving circuit is switched to a mode where a scanning signal is supplied from the gate lines G1, G3, . . . G2n−1 included in the first scanning signal line group and the gate lines G2, G4, . . . G2n included in the second scanning signal line group during both the period of 1/120 seconds of the first half and the period of 1/120 seconds of the latter half.

Accordingly, when the data signal driving circuit is configured to supply a data signal for two successive lines from each of the source lines Sza and Szb separately, it is possible to write data signals for two successive lines updated for each predetermined time period in the display pixels PX included in two adjacent rows at the same time. Also, although the frame frequency is doubled compared to that of Embodiment 1, it is possible to make the time for writing a data signal to display pixels PX substantially equal to that of Embodiment 1.

Moreover, according to Embodiments 1 and 2, in accordance with a display mode switching signal received by the signal separation circuit 41, it is possible to switch the mode in which a scanning signal is supplied from the gate lines G1, G3, . . . G2n−1 included in the first scanning line group during the period of $1/120$ seconds of the first half, and a scanning signal is supplied from the gate lines G2, G4, . . . G2n included in the second scanning line group during the period of $1/120$ seconds of the latter half, with the mode in which a scanning signal is supplied from the gate lines G1, G3, . . . G2n−1 included in the first scanning line group and the gate lines G2, G4, . . . G2n included in the second scanning line group for both the period of $1/120$ seconds of the first half and the period of $1/120$ seconds of the latter half.

One cycle of a frame frequency in Embodiment 1 corresponds to $1/60$ seconds and that in Embodiment 2 corresponds to $1/120$ seconds. It is not limited to the case and the frame frequency can be appropriately set in accordance with a mode switching signal (or irrespective of a mode switching signal).

The embodiments as disclosed are illustrative and not restrictive in all respects. The scope of the present invention is defined by the claims rather than by the description preceding them, and all changes that fall within metes and bounds of the claims, or equivalence of such metes and bounds thereof are therefore intended to be embraced by the claims. Also, the technical features described in the respective embodiments can be combined with each other.

The invention claimed is:

1. A liquid crystal display device comprising:
a plurality of switching elements arranged in a matrix;
a plurality of scanning signal lines for supplying a scanning signal from a scanning signal driving circuit to the respective switching elements in each row;
a plurality of data signal lines for supplying a data signal from a data signal driving circuit to the respective switching elements in each column; and
a plurality of display pixels respectively connected to the plurality of switching elements, wherein
the data signal lines are configured with a first data signal line for supplying the data signal to switching elements in every other row and a second data signal line for supplying the data signal to switching elements in the other rows,
the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line,
the scanning signal driving circuit is configured to sequentially supply the scanning signal during a predetermined period through the scanning signal lines included in the first scanning signal line group, and to sequentially supply the scanning signal during a second period that is not overlapped with the predetermined period through the scanning signal lines included in the second scanning signal line group,
the data signal driving circuit is configured to supply the data signals through the first and second data signal lines during the predetermined period in such a manner that changing directions of voltages of the data signals are opposite to each other, and
a brightness of the display pixel connected to the switching element to which the scanning signal is supplied during the second period is made darker than a brightness of the display pixel connected to the switching element to which the scanning signal is supplied during the predetermined period.

2. The liquid crystal display device according to claim 1, wherein
a data signal supplied through the first data signal line configures a video frame, and
the data signal driving circuit is configured such that, for a data signal supplied through the first data signal line during the predetermined period within one video frame period and for a data signal supplied through the first data signal line during the predetermined period within a video frame following said one video frame period, polarities of voltages of the data signals with respect to a predetermined potential are made opposite to each other.

3. The liquid crystal display device according to claim 1, wherein
a data signal supplied through the second data signal line configures a video frame, and
the data signal driving circuit is configured such that, for a data signal supplied through the second data signal line during the second period within one video frame period and for a data signal supplied through the second data signal line during the second period within a video frame following said one video frame period, polarities of voltages of the data signals with respect to a predetermined potential are made opposite to each other.

4. The liquid crystal display device according to claim 1, wherein
the data signal driving circuit is configured to supply a data signal of a predetermined gradation through the second data signal line during the second period.

5. The liquid crystal display device according to claim 4, wherein
the predetermined gradation is a gradation of black.

6. The liquid crystal display device according to claim 1, further comprising a reception part receiving a predetermined signal, wherein
the scanning signal driving circuit is configured to switch between a mode in which, according to the signal received by the reception part, the scanning signal is supplied through the scanning signal line included in the first scanning signal line group during the predetermined period while the scanning signal is supplied through the scanning signal line included in the second scanning signal line group during the second period and a mode in which the scanning signals are supplied through the scanning signal lines respectively included in the first scanning signal line group and the second scanning signal line group during both the predetermined period and the second period.

7. A liquid crystal display device comprising:
a plurality of switching elements arranged in a matrix;
a plurality of scanning signal lines for supplying a scanning signal from a scanning signal driving circuit to the respective switching elements in each row;

a plurality of data signal lines for supplying a data signal from a data signal driving circuit to the respective switching elements in each column; and a plurality of display pixels respectively connected to the plurality of switching elements, wherein the data signal lines are configured with a first data signal line for supplying the data signal to switching elements in every other row and a second data signal line for supplying the data signal to switching elements in the other rows, the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line, the scanning signal driving circuit is configured to sequentially supply the scanning signal during a predetermined period through the scanning signal lines included in the first scanning signal line group, and to sequentially supply the scanning signal during a second period that is not overlapped with the predetermined period through the scanning signal lines included in the second scanning signal line group, and the data signal driving circuit is configured to supply the data signals through the first and second data signal lines during the predetermined period in such a manner that changing directions of voltages of the data signals are opposite to each other, and to supply, during the second period through the second data signal line, a data signal with an effective voltage to be applied to the display pixels being lower than that of an effective voltage for the data signal supplied during the predetermined period.

8. The liquid crystal display device according to claim 7, wherein a data signal supplied through the first data signal line configures a video frame, and the data signal driving circuit is configured such that, for a data signal supplied through the first data signal line during the predetermined period within one video frame period and for a data signal supplied through the first data signal line during the predetermined period within a video frame following said one video frame period, polarities of voltages of the data signals with respect to a predetermined potential are made opposite to each other.

9. The liquid crystal display device according to claim 7, wherein a data signal supplied through the second data signal line configures a video frame, and the data signal driving circuit is configured such that, for a data signal supplied through the second data signal line during the second period within one video frame period and for a data signal supplied through the second data signal line during the second period within a video frame following said one video frame period, polarities of voltages of the data signals with respect to a predetermined potential are made opposite to each other.

10. The liquid crystal display device according to claim 7, wherein the data signal driving circuit is configured to supply a data signal of a predetermined gradation through the second data signal line during the second period.

11. The liquid crystal display device according to claim 10, wherein the predetermined gradation is a gradation of black.

12. The liquid crystal display device according to claim 7, further comprising a reception part receiving a predetermined signal, wherein the scanning signal driving circuit is configured to switch between a mode in which, according to the signal received by the reception part, the scanning signal is supplied through the scanning signal line included in the first scanning signal line group during the predetermined period while the scanning signal is supplied through the scanning signal line included in the second scanning signal line group during the second period and a mode in which the scanning signals are supplied through the scanning signal lines respectively included in the first scanning signal line group and the second scanning signal line group during both the predetermined period and the second period.

13. A liquid crystal display device comprising:

a plurality of switching elements arranged in a matrix;

a plurality of scanning signal lines for supplying a scanning signal from a scanning signal driving circuit to the respective switching elements in each row;

a plurality of data signal lines for supplying a data signal from a data signal driving circuit to the respective switching elements in each column; and a plurality of display pixels respectively connected to the plurality of switching elements, wherein the data signal lines are configured with a first data signal line for supplying the data signal to switching elements in every other row and a second data signal line for supplying the data signal to switching elements in the other rows, the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line, the scanning signal driving circuit is configured to sequentially supply the scanning signal during a predetermined period through the scanning signal lines included in the first scanning signal line group, and to sequentially supply the scanning signal during a second period that is not overlapped with the predetermined period through the scanning signal lines included in the second scanning signal line group, and the data signal driving circuit is configured to supply the data signals through the first and second data signal lines during the predetermined period in such a manner that changing directions of voltages of the data signals are opposite to each other, and to supply, during the second period through the second data signal line, a data signal representing an image darker than an image to be displayed by the data signal supplied during the predetermined period.

14. The liquid crystal display device according to claim 13, wherein a data signal supplied through the first data signal line configures a video frame, and the data signal driving circuit is configured such that, for a data signal supplied through the first data signal line during the predetermined period within one video frame period and for a data signal supplied through the first data signal line during the predetermined period within a video frame following said one video frame period, polarities of voltages of the data signals with respect to a predetermined potential are made opposite to each other.

15. The liquid crystal display device according to claim 13, wherein
a data signal supplied through the second data signal line configures a video frame, and
the data signal driving circuit is configured such that, for a data signal supplied through the second data signal line during the second period within one video frame period and for a data signal supplied through the second data signal line during the second period within a video frame following said one video frame period, polarities of voltages of the data signals with respect to a predetermined potential are made opposite to each other.

16. The liquid crystal display device according to claim 13, wherein
the data signal driving circuit is configured to supply a data signal of a predetermined gradation through the second data signal line during the second period.

17. The liquid crystal display device according to claim 16, wherein
the predetermined gradation is a gradation of black.

18. The liquid crystal display device according to claim 13, further comprising a reception part receiving a predetermined signal, wherein
the scanning signal driving circuit is configured to switch between a mode in which, according to the signal received by the reception part, the scanning signal is supplied through the scanning signal line included in the first scanning signal line group during the predetermined period while the scanning signal is supplied through the scanning signal line included in the second scanning signal line group during the second period and a mode in which the scanning signals are supplied through the scanning signal lines respectively included in the first scanning signal line group and the second scanning signal line group during both the predetermined period and the second period.

19. A liquid crystal display device comprising:
a plurality of switching elements arranged in a matrix;
a plurality of scanning signal lines for supplying a scanning signal from a scanning signal driving circuit to the respective switching elements in each row;
a plurality of data signal lines for supplying a data signal from a data signal driving circuit to the respective switching elements in each column;
a plurality of display pixels respectively connected to the plurality of switching elements; and
a polarization filter changing a polarization state of light transmitting through the display pixels connected to the switching elements contained in the every other row to be alternately different states in a row direction, wherein
the data signal lines are configured with a first data signal line for supplying the data signal to switching elements in every other row and a second data signal line for supplying the data signal to switching elements in the other rows,
the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line,
the scanning signal driving circuit is configured to sequentially supply the scanning signal during a predetermined period through the scanning signal lines included in the first scanning signal line group,
the data signal driving circuit is configured to supply the data signals through the first and second data signal lines during the predetermined period in such a manner that changing directions of voltages of the data signals are opposite to each other, and
the polarization filter is configured such that a boundary where a polarization state of light changed by the polarization filter changes and the display pixels connected to the switching elements in the other rows are overlapped in a planer direction of the matrix in which the switching elements are arranged.

20. A liquid crystal display device comprising:
a plurality of switching elements arranged in a matrix;
a plurality of scanning signal lines for supplying a scanning signal from a scanning signal driving circuit to the respective switching elements in each row;
a plurality of data signal lines for supplying a data signal from a data signal driving circuit to the respective switching elements in each column;
a plurality of display pixels respectively connected to the plurality of switching elements; and
a polarization filter changing a polarization state of light transmitting through the display pixels connected to the switching elements contained in the every other row to be alternately different states in a row direction, wherein
the data signal lines are configured with a first data signal line for supplying the data signal to switching elements in every other row and a second data signal line for supplying the data signal to switching elements in the other rows,
the scanning signal lines are grouped in a first scanning signal line group for supplying the scanning signal to the switching elements to which the data signal is supplied from the first data signal line and a second scanning signal line group for supplying the scanning signal to the switching elements to which the data signal is supplied from the second data signal line,
the scanning signal driving circuit is configured to sequentially supply the scanning signal during a predetermined period through the scanning signal lines included in the first scanning signal line group, and
the data signal driving circuit is configured to supply the data signals through the first and second data signal lines during the predetermined period in such a manner that changing directions of voltages of the data signals are opposite to each other, and to alternately supply data signals respectively representing a left eye image and a right eye image of a three dimensional image through the first data signal line during the predetermined period.

* * * * *